United States Patent

[11] 3,607,302

[72] Inventor Russell C. Beck
 617 Cityview Ave., Avalon, Pa. 15202
[21] Appl. No. 885,565
[22] Filed Dec. 16, 1969
[45] Patented Sept. 21, 1971

[54] COFFEE BAG
 2 Claims, 5 Drawing Figs.
[52] U.S. Cl. .................................................... 99/77.1,
 99/295
[51] Int. Cl. ...................................................... A23f 1/00
[50] Field of Search........................................... 99/77.1,
 295

[56] References Cited
 UNITED STATES PATENTS
2,406,137  8/1946  Eaton........................... 99/77.1
3,053,665  9/1962  Irmscher....................... 99/77.1
3,083,100  3/1963  Baran............................ 99/77.1
 FOREIGN PATENTS
 528,819  6/1955  Italy.............................. 99/295

Primary Examiner—Tim R. Miles
Assistant Examiner—Steven H. Markowitz
Attorney—Carl Miller ABSTRACT: A coffee bag for brewing an individual cup of coffee, the device comprising a tea baglike assembly, consisting of a porous paper envelop containing a premeasured amount of ground coffee beans, and the envelop being attached to one end of a string for conveniently dipping into a cup of boiling hot water.

PATENTED SEP 21 1971
3,607,302
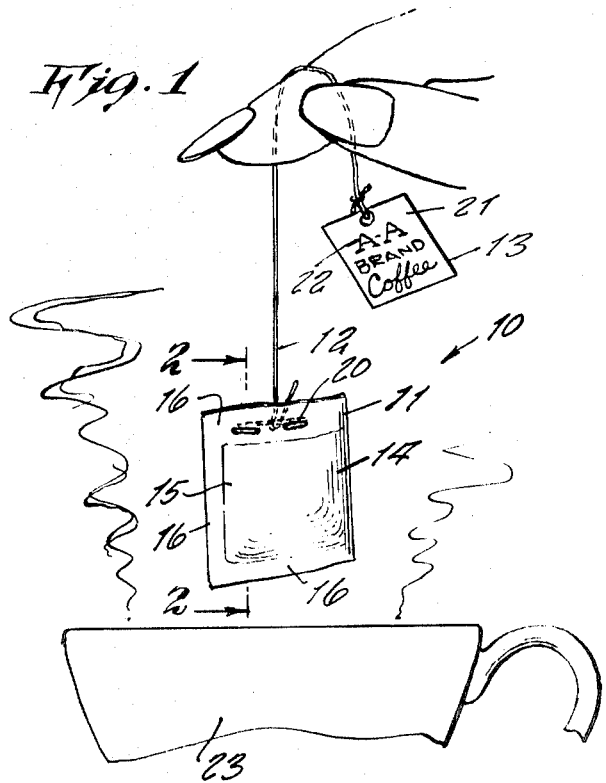
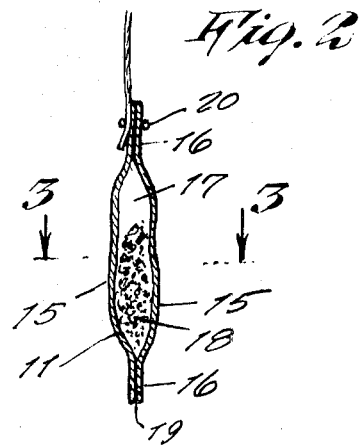
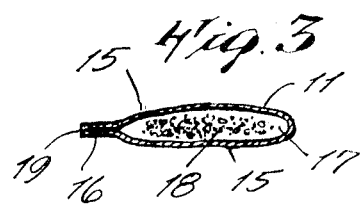
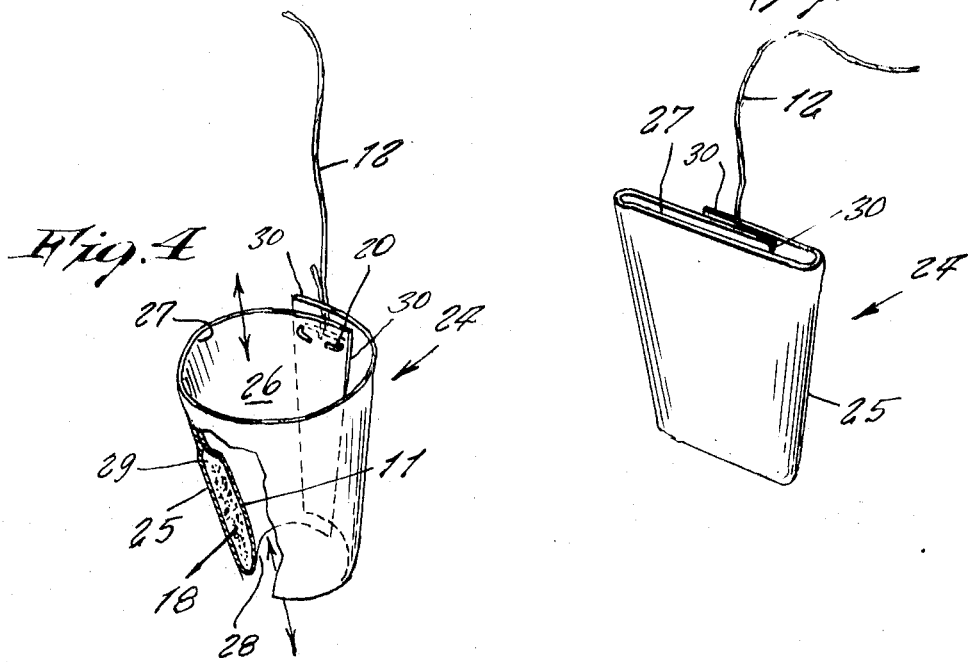
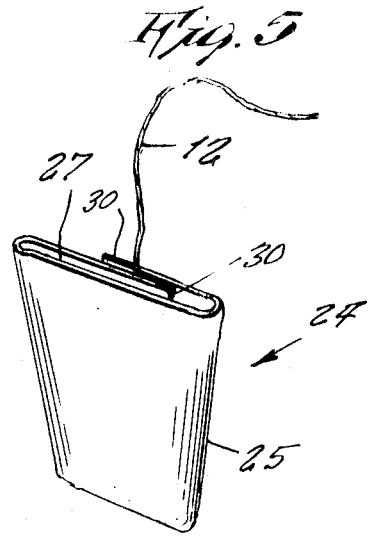
INVENTOR
RUSSELL C. BECK
Carl Miller
ATTORNEY

COFFEE BAG

SUMMARY OF THE INVENTION

In accordance with the principles of my invention, I prepare a hollow bag filled with ground coffee and peripherally sealed. The bag is porous being formed from a fine mesh cloth or other material that is inexpensive, disposable and will not dissolve in hot water or react chemically with the water and/or coffee. A string is tied at one end to the bag. With the string held at its other end, the filled bag is held in a cup of boiling or very hot water for a period of 50 or 60 seconds and then is stirred with a spoon. The result is an excellent cup of coffee.

This invention relates generally to coffee brewing equipment. More specifically it relates to coffee packaging.

A principal object of the present invention is to provide a novel means of packaging coffee so that an individual cup of coffee may be conveniently and quickly brewed.

Another object of the present invention is to provide a coffee bag for brewing an individual cup of coffee which contains a premeasured amount of ground coffee beans so that a uniform consistency of brewing is attained, and wherein according the coffee beans are not wasted by using an excessive amount thereof.

Yet another object is to provide a coffee bag wherein the ground coffee beans are contained within an inexpensive disposable envelop made of porous paper or cloth secured to one end of a string for conveniently dipping the bag in a cup of heated water.

Yet a further object is to provide a coffee bag wherein the opposite end of the string may have an advertising label secured thereto, and which serves as a convenient handle by which the string may be held during dipping action.

Yet a further object is to provide a coffee bag wherein the bag in use is conically configurated with a vertical downwardly converging central opening therethrough so that during dipping action, the water in the central opening is forced radially outwardly through the bag walls when the bag is upwardly pulled, thus brewing the water more uniformly.

Other objects are to provide a coffee bag which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown in operative use.

FIG. 2 is a longitudinal cross-sectional view taken on line 2—2 of FIG. 1.

FIG. 3 is a transverse cross-sectional view taken on line 3—3 of FIG. 2.

FIG. 4 is a perspective view of a modified design of the present invention illustrating a vertical flow-through type of coffee bag, and shown in operative expanded position.

FIG. 5 is a perspective view of the coffee bag illustrated in FIG. 4, and shown in collapsed position for packaging purpose.

Referring now the drawing in detail, the reference numeral 10 represents a coffee bag according to the present invention wherein there is a bag member 11 secured to one end of a string 12, the opposite end of the string being secured to a label 13.

The bag 11 comprises an envelop 14 made either of thin porous paper or cloth so to permit flow of heated water therethrough. The envelop is comprised of front and rear panels 15 formed by folding the paper or cloth material, the edges 16 thereof being secured together to form a pocket 17 within which a premeasured quantity of ground coffee beans 18 have been placed prior to securing the edges either by adhesive 19 if paper material is used or by a stitching of cloth is used.

One end of the string 12 is secured inexpensively to the bag simply and easily by a staple 20.

The label 13 at the other end of the string provides a flat surface 21 upon which a brand name 22 and other advertising may be imprinted. The label can serve as a convenient handle when dipping the coffee bag and it also serves to retain the end of the string from falling into the cup when the coffee bag is allowed to steep in the cup.

In operative use, as shown in FIG. 1, the bag is usually simply dipped up and down into heated water contained in coffee cup 23 until a desired brew is obtained, after which the coffee bag is disposed.

In FIGS. 4 and 5, a modified design of the present invention is shown wherein a coffee bag 24 comprises a novel vertical flow-through type formed by a conically configurated envelop 25 around a central opening 26 therethrough, the upper end of which has a wide mouth 27 and the lower end has a narrow mouth 28. The envelop is made of like material as above described and has a conical pocket 29 containing the ground coffee beans 18. The envelop is secured to string 12 by a staple 20 which in the present form of the invention also serves to enjoin the ends 30 together so to maintain the envelop in a conical shape.

This type of flow-through coffee bag may be retailed in packages wherein a number of the coffee bags are placed, and wherein for economy of space the bags are flattened, as shown in FIG. 5, so that the coffee bags are positioned neatly side by side adjacent each other within the package or carton.

In operative use, the flow-through coffee bag 24 is dipped up and down into heated water, with the bag assuming the conical shape so that water moves vertically therethrough. Due to the conical shape, as the bag is pulled upwardly through the water, the water in the central opening exerts a sideward pressure against the inner surface of the envelope causing the water to move radially outward through the bag thus brewing the water as it filters through the ground coffee. This gentle action imparts a more delicate flavor.

While various changes may be made in the detail construction, it is to be understood that such changes will be within the spirit and scope of the present invention as is defined by the appended claims.

1. A coffee bag comprising a porous envelope containing ground coffee beans in a lower transverse pocket with overlapping longitudinal ends joined together encompassing a central longitudinal conduit space therein, including an upper transverse seam adjacent said lower pocket in combination with a string and means securing said seam and string adjacent said ends, whereby movement of the bag longitudinally in a container of brewing water causes longitudinal flow of water through the said space.

2. A coffee bag as in claim 1 wherein the envelope is trapezoidal when collapsed and expands to a conical configuration with a smaller lower aperture when opened, immersed and pulled through brewing water.